UNITED STATES PATENT OFFICE.

ARCHIBALD B. TRIPLER, OF PHILADELPHIA, PENNSYLVANIA, ASSIGNOR TO CHARLES E. TRIPLER.

IMPROVEMENT IN PRESERVING WOOD FOR RAILROAD-TIES, &c.

Specification forming part of Letters Patent No. 104,917, dated June 28, 1870; reissue No. 4,837, dated March 26, 1872.

DIVISION A.

*To all whom it may concern:*

Be it known that I, ARCHIBALD B. TRIPLER, formerly of New Orleans, in the State of Louisiana, but now of the city and county of Philadelphia and State of Pennsylvania, have invented a new and useful Method for Preventing the Rot or Decay of Railroad-Ties, &c.; and I do hereby declare that the following is a full, clear, and exact description of the same, which will enable those skilled in the art to carry out my invention.

In an application for Letters Patent of even date herewith, I have described and claimed the construction of a railroad-tie composed of two or more slabs or laminæ, united together firmly by dowel-pins, whereby a tie is produced ready to be laid in position on the road-bed, while it possesses facility of repair and an elasticity not possessed by the ordinary solid tie.

My present invention looks to the preservation of a railroad-tie thus constructed; and it consists in immersing the slabs composing it in a solution of antiseptic agents, to be hereinafter named, and afterward subjecting it to a bath of coal-tar and powdered charcoal, by which the said slabs are thoroughly impregnated with a preservative, while, when they are united, interior partitions or walls of antiseptic material will insulate each slab, effectually preventing atmospheric decomposition, fermentation, or dry-rot.

The antiseptic which I have used is composed of the following and in about the proportionate parts herein given, though I do not confine myself to its use specially, but purpose using any other antiseptic agent I may elect.

| | |
|---|---|
| Coal-pitch or asphaltum, parts, | 80 |
| Sulphur, parts, | 5 |
| Arsenic, parts, | 5 |
| Coal-tar, parts, | 5 |
| Powdered charcoal, parts, | 5 |
| | 100 |

After the slabs composing the tie are subjected to the bath of antiseptics above stated, they are firmly united together by dowel-pins which have also been submitted to the action of preservative agents. Thus a tie is produced having all of its constituent parts preserved, and that, too, in a much shorter time and in a more thorough manner than by any system heretofore adopted, while the tie itself possesses advantages not possessed by any other.

Having described my invention, I claim—

1. Ties, bed-sills, &c., to be preserved from decay, made in sections or slabs, and secured together, for the purpose and in the manner herein described.

2. In a tie or bed-sill made in sections or slabs, the intervention of partition or division walls of antiseptic or preservative agents between their adjacent sides, as herein described.

3. The method herein described of preserving timber from decay.

ARCHIBALD B. TRIPLER.

Witnesses:
FRED. DALY,
CHAS. E. UPPERMAN.